(12) United States Patent
Ishida

(10) Patent No.: US 11,177,689 B2
(45) Date of Patent: Nov. 16, 2021

(54) UNINTERRUPTED POWER SUPPLY APPARATUS

(71) Applicant: FUJI ELECTRIC CO., LTD., Kanagawa (JP)

(72) Inventor: Satoshi Ishida, Hyogo (JP)

(73) Assignee: FUJI ELECTRIC CO., LTD., Kawasaki (JP)

( * ) Notice: Subject to any disclaimer, the term of this patent is extended or adjusted under 35 U.S.C. 154(b) by 0 days.

(21) Appl. No.: 17/001,995

(22) Filed: Aug. 25, 2020

(65) Prior Publication Data

US 2020/0389047 A1 Dec. 10, 2020

Related U.S. Application Data

(63) Continuation of application No. PCT/JP2019/028771, filed on Jul. 23, 2019.

(30) Foreign Application Priority Data

Sep. 27, 2018 (JP) .............................. JP2018-181471

(51) Int. Cl.
  *H02J 9/06* (2006.01)
  *H02J 7/06* (2006.01)
  *H02M 3/158* (2006.01)

(52) U.S. Cl.
  CPC ................ *H02J 9/062* (2013.01); *H02J 7/06* (2013.01); *H02M 3/158* (2013.01); *H02J 2207/20* (2020.01)

(58) Field of Classification Search
  CPC .......... H02J 9/062; H02J 7/06; H02J 2207/20; H02M 3/158

(Continued)

(56) References Cited

U.S. PATENT DOCUMENTS

2007/0210652 A1\* 9/2007 Tracy ...................... H02J 9/062
                                                                307/66
2017/0033593 A1\* 2/2017 Kamizuma ............. H02J 9/062

FOREIGN PATENT DOCUMENTS

JP       2002-345252      11/2002
JP       2012-055112       3/2012

(Continued)

OTHER PUBLICATIONS

International Search Report dated Sep. 24, 2019 with respect to PCT/JP2019/028771.

(Continued)

*Primary Examiner* — Michael R. Fin
(74) *Attorney, Agent, or Firm* — IPUSA, PLLC

(57) ABSTRACT

An uninterrupted power supply apparatus includes a plurality of uninterrupted power supply modules each including a converter, a chopper, and an inverter, and a first control unit configured to output an voltage indication and phase information for controlling timing of switching operations of switching devices in the chopper and the inverter, wherein each of the uninterrupted power supply modules includes a second control unit that is configured to generate a first triangular carrier in synchronization with the phase information, to generate a second triangular carrier such that a phase of the second triangular carrier is synchronized with a phase of the first triangular carrier, the first triangular carrier being used with the voltage indication to control switching operations of the switching devices in the inverter, the second triangular carrier being used with the voltage indication to control switching operations of the switching devices in the chopper.

4 Claims, 7 Drawing Sheets

(58) Field of Classification Search
USPC .......................................................... 307/64
See application file for complete search history.

(56) References Cited

FOREIGN PATENT DOCUMENTS

JP  2013-223313  10/2013
JP  2018-007377  1/2018

OTHER PUBLICATIONS

Written Opinion of The International Searching Authority dated Sep. 24, 2019 with respect to PCT/JP2019/028771.

* cited by examiner

FIG.4
(A) MAIN CONTROL UNIT 20
CARRIER AT FIRST CONTROL UNIT 2
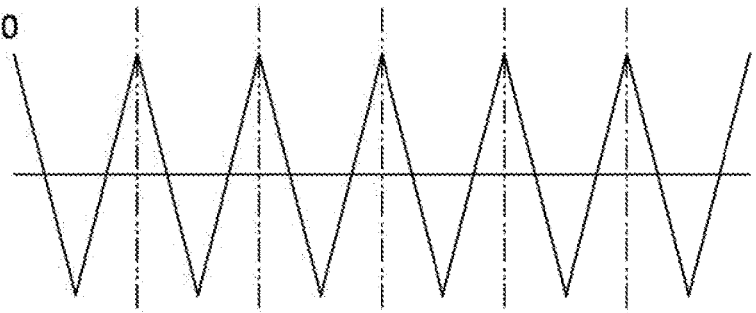
(B) FIRST UNINTERRUPTED POWER SUPPLY MODULE 31
(B-1) INVERTER CARRIER
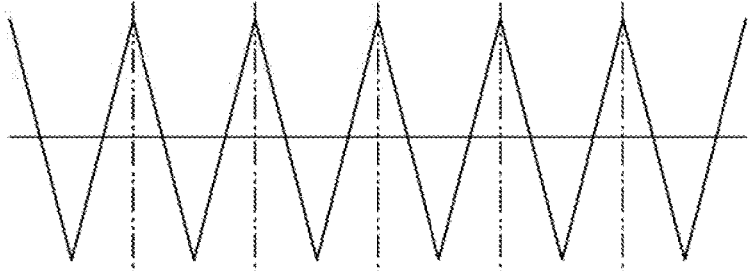
(B-2) CHOPPER CARRIER
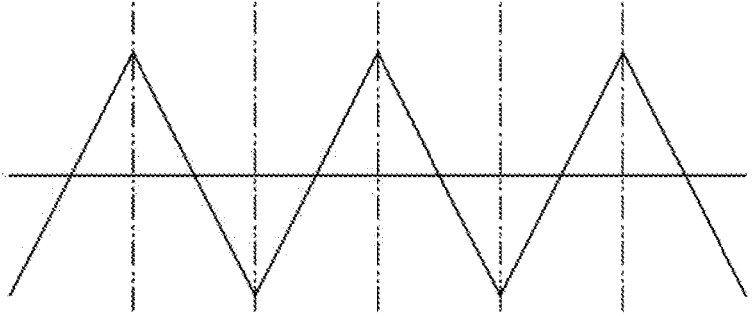
(C) SECOND UNINTERRUPTED POWER SUPPLY MODULE 32
(C-1) INVERTER CARRIER
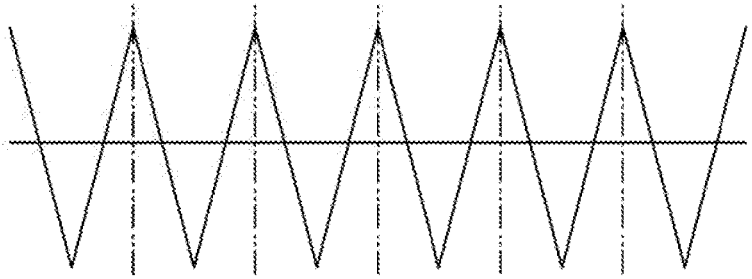
(C-2) CHOPPER CARRIER
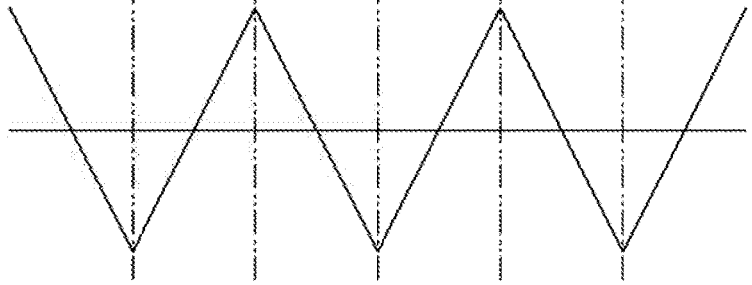

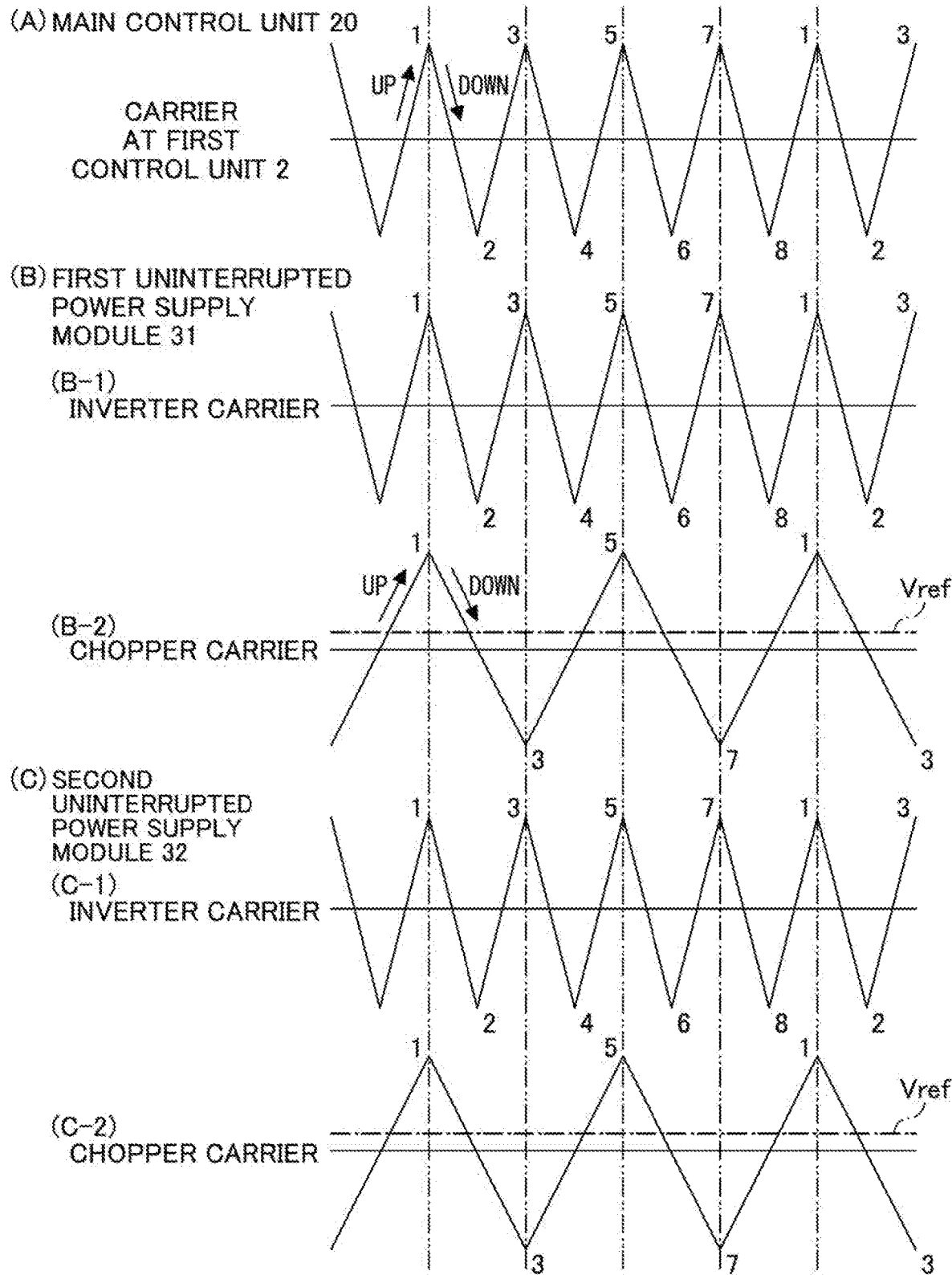

UNINTERRUPTED POWER SUPPLY APPARATUS

CROSS-REFERENCE TO RELATED APPLICATIONS

This application is a continuation of International Application PCT/JP2019/028771, filed on Jul. 23, 2019 and designated the U.S., which is based on and claims priority to Japanese Patent Application No. 2018-181471 filed on Sep. 27, 2018, with the Japan Patent Office. The entire contents of these applications are incorporated herein by reference.

BACKGROUND OF THE INVENTION

1. Field of the Invention

The disclosures herein relate to an uninterrupted power supply apparatus that is equipped with a plurality of uninterrupted power supply modules each having a battery, a converter, and an inverter, and that continues supplying stable power by switching the power source to the load from commercial power supply to batteries in the event of failure of commercial power supply, for example.

2. Description of the Related Art

Patent Document 1 discloses a technology in which a main controller and a gate controller situated apart from each other perform serial communication to establish carrier synchronization and to generate gate pulses.

The technology disclosed in Patent Document 1 may be applied to an uninterrupted power supply apparatus in which a main control unit and a plurality of uninterrupted power supply modules serving as sub-control units share one battery. In such a case, the presence of misalignment of power activation timings between the uninterrupted power supply modules, if any, may cause a 180-degree displacement between chopper carriers generated by the uninterrupted power supply modules. The chopper carriers are a triangular wave for determining the phase of a PWM signal, which drives the switching elements of a chopper provided in each of the uninterrupted power supply modules. Displacements occurring in the phases of chopper carriers cause potential differences between the choppers of the uninterrupted power supply modules, which causes the problem that circulating current called cross current occurs.

Accordingly, there may be a need to provide an uninterrupted power supply apparatus that reduces the occurrence of cross current in a battery-shared configuration.
[Patent Document 1] Japanese Laid-open Patent Publication No. 2013-223313

SUMMARY OF THE INVENTION

According to an embodiment, an uninterrupted power supply apparatus includes a battery, a plurality of uninterrupted power supply modules each including a converter, a chopper, and an inverter, the converter configured to convert an AC voltage to a first DC voltage, the chopper configured to convert the first DC voltage from the converter to charge the battery and to convert a second DC voltage from the battery into a third DC voltage, the inverter configured to convert the first DC voltage from the converter or the third DC voltage from the chopper into an AC voltage, and a first control unit configured to output a voltage indication and phase information for controlling timing of switching operations of switching devices provided in the chopper and the inverter, wherein each of the uninterrupted power supply modules includes a second control unit that is configured to generate a first triangular carrier in synchronization with the phase information, to generate a second triangular carrier such that a phase of the second triangular carrier is synchronized with a phase of the first triangular carrier, the first triangular carrier being used with the voltage indication to control switching operations of the switching devices provided in the inverter, the second triangular carrier being used with the voltage indication to control switching operations of the switching devices provided in the chopper.

According to at least one embodiment, the occurrence of cross current is reduced in a battery-shared configuration.

BRIEF DESCRIPTION OF THE DRAWINGS

FIG. 4 is a drawing illustrating the phases of chopper carriers observed when cross current occurs;

FIG. 7 is a drawing illustrating the synchronized phases of peaks of chopper carriers.

DESCRIPTION OF THE PREFERRED EMBODIMENTS

In the following, an interrupted power supply apparatus according to an embodiment will be described with reference to the accompanying drawings. It should be noted that this embodiment does not limit the present invention.

Embodiment

Figure 1:
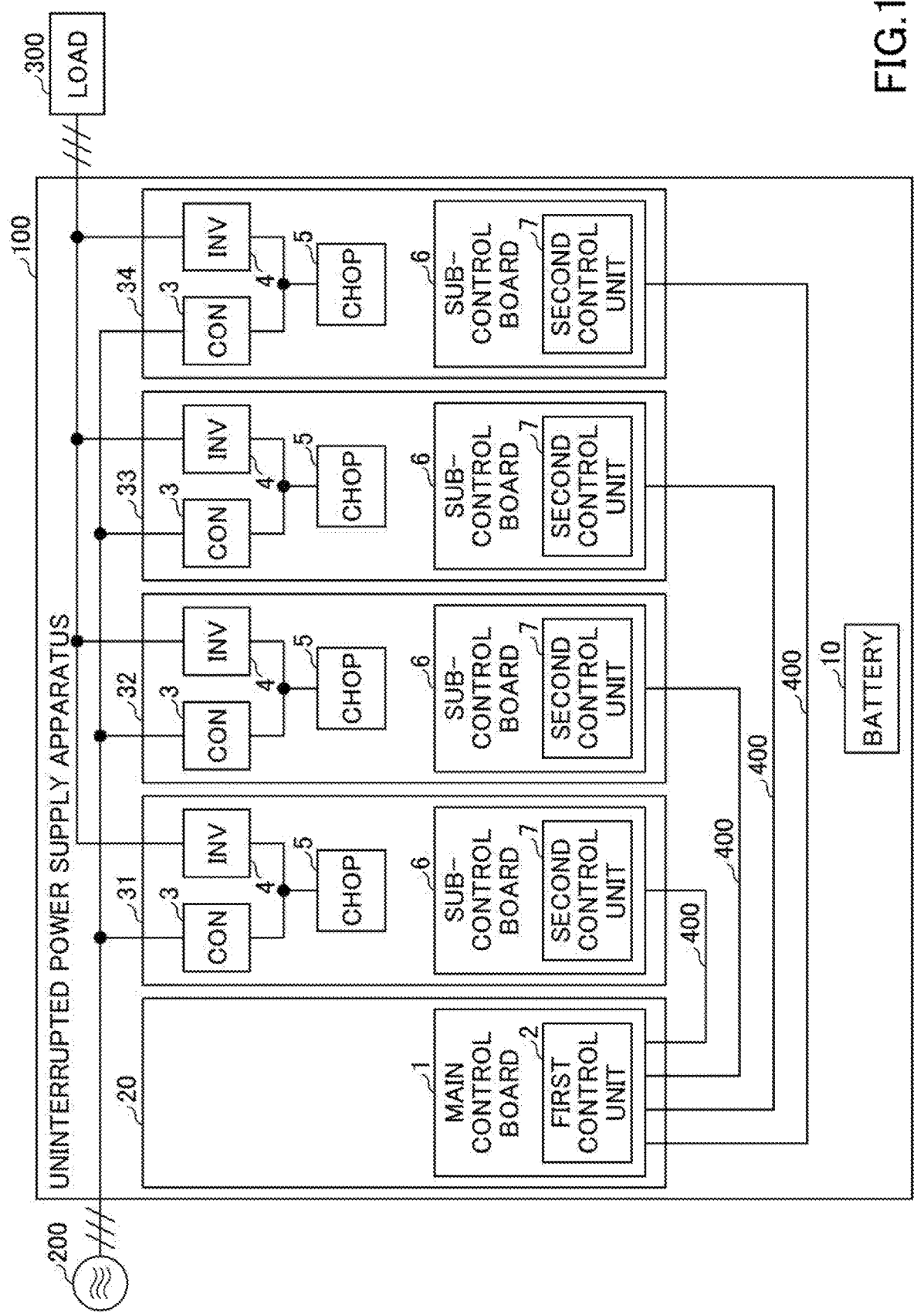
FIG. 1 is a block diagram illustrating a schematic configuration of an uninterrupted power supply apparatus according to an embodiment.

FIG. 1 is a block diagram illustrating a schematic configuration of an uninterrupted power supply apparatus according to an embodiment. An uninterrupted power supply apparatus 100 according to the embodiment continues supplying power to a load 300 by switching the power supply source to the load 300 from an AC power supply 200 to a battery 10 even in the event of power failure or the like in the AC power supply 200 that is a commercial power supply. The load 300 is a server installed in a data center, for example.

The uninterrupted power supply apparatus 100 includes the battery 10, a main control unit 20, a first uninterrupted power supply module 31, a second uninterrupted power supply module 32, a third uninterrupted power supply module 33, and a fourth uninterrupted power supply module 34. In the following, the first uninterrupted power supply module 31, the second uninterrupted power supply module 32, the third uninterrupted power supply module 33, and the fourth uninterrupted power supply module 34 may each be referred to simply as an uninterrupted power supply module when they are not discriminated from each other. Further, the first uninterrupted power supply module 31, the second uninterrupted power supply module 32, the third uninterrupted power supply module 33, and the fourth uninterrupted power supply module 34 may be referred to as a plurality of uninterrupted power supply modules.

The main control unit 20 and the plurality of uninterrupted power supply modules are contained in a plurality of cuboid cases arranged side by side, for example. These cases are installed in a data center or the like. In the present embodiment, four uninterrupted power supply modules are provided in the uninterrupted power supply apparatus 100. It may be noted that the number of uninterrupted power supply modules is not limited to four, and may be less than four, or may be greater than or equal to five. The number of uninterrupted power supply modules is adjusted in accordance with the power capacity of the load 300. For example, two uninterrupted power supply modules may run in parallel when the capacity of the load 300 is relatively small, and three or four uninterrupted power supply modules may run in parallel when the capacity of the load 300 is relatively large.

The main control unit 11 is provided with a main control board 1. The main control board 1 is provided with a first control unit 2. The first control unit 2 is implemented as an FPGA (field-programmable gate array), for example. Rather than being implemented as an FPGA, the first control unit 2 may alternatively be implemented as a single circuit, a combined circuit, a programmed processor, a parallel programmed processor, an ASIC (application specific integrated circuit), or a combination thereof. The first control unit 2 generates information, such as phase information and a voltage indication, for controlling the timing of the switching operations of a chopper 5 and an inverter 4, for example, which are provided in each of the uninterrupted power supply modules.

Each of the plurality of uninterrupted power supply modules includes a converter (CON) 3 for converting the AC voltage supplied from the AC power supply 200 into a DC voltage, an inverter (INV) 4 for converting the DC voltage into an AC voltage, a chopper (CHOP) 5, and a sub-control board 6. The converter 3 is a rectifier implemented by combining a smoothing capacitor with a diode bridge comprised of four diodes, for example. The inverter 4 includes a plurality of semiconductor switching devices. These semiconductor switching devices perform switching operations (i.e., on and off operations) to convert a DC voltage into an AC voltage. The AC voltage output from the inverter 4 is applied to the load 300. The configurations of the converter 3 and the inverter 4 are known in the art, and a detailed description of these configurations is omitted.

The sub-control board 6 is provided with a second control unit 7. The second control unit 7 is implemented as an FPGA (field-programmable gate array), for example. Rather than being implemented as an FPGA, the second control unit 7 may alternatively be implemented as a single circuit, a combined circuit, a programmed processor, a parallel programmed processor, an ASIC, or a combination thereof.

The connection topology of the first control unit 2 and the second control units 7 provided in the respective uninterrupted power supply modules is a star connection. Namely, each of the plurality of second control units 7 is directly connected to the first control unit 2 through a communication line 400.

The second control unit 7 generates a first triangular wave carrier serving as an inverter carrier and a second triangular wave carrier serving as a chopper carrier based on the phase information, which is output from the first control unit 2.

The inverter carrier serves to control the switching operation of the semiconductor switching devices included in the inverter 4. The phase of the inverter carrier is synchronized with the phase information output from the first control unit 2. The chopper carrier serves to control the switching operation of semiconductor switching devices included in the chopper 5. The operation of synchronizing the chopper carrier, the inverter carrier, and the like will be described later. It may be noted that the phase of the chopper carrier is synchronized with the phase of the inverter carrier, and the period of the chopper carrier is n times the period of the inverter carrier (n is a natural number greater than or equal to one), for example. In the following, a description will be given with respect to an example in which the period of the chopper carrier is twice the period of the inverter carrier. It should be noted that the period of the chopper carrier is not limited to this example.

The second control unit 7 compares the inverter carrier with the voltage indication to generate a first PWM (pulse width modulation) signal for controlling the switching operation of the semiconductor switching devices included in the inverter 4. The first PWM signal is amplified to a voltage capable of driving the semiconductor switching devices included in the inverter 4 for use as a first drive signal in the inverter 4. The first drive signal is generated by a drive circuit provided in the inverter 4 or in the second control unit 7. The semiconductor switching devices included in the inverter 4 perform switching operations in response to the first drive signal, thereby converting the DC voltage output from the converter 3 or from the chopper 5 to an AC voltage.

The second control unit 7 compares the chopper carrier with the voltage indication to generate a second PWM signal for controlling the switching operation of the semiconductor switching devices included in the chopper 5. The second PWM signal is amplified to a voltage capable of driving the semiconductor switching devices included in the chopper 5 for use as a second drive signal in the chopper 5. The second drive signal is generated by a drive circuit provided in the chopper 5 or in the second control unit 7. The semiconductor switching devices included in the chopper 5 perform switching operations in response to the second drive signal, thereby causing the chopper 5 to perform a step-up operation or a step-down operation. In the case of no power failure occurring in the AC power supply 200, for example, the DC voltage output from the converter 3 is applied to the chopper 5, which performs a step-down operation to lower the DC voltage. The lowered voltage is then applied to the battery 10. With this arrangement, part of the power supplied from the AC power supply 200 is utilized to charge the battery 10. In the case of power failure occurring in the AC power supply 200, a DC voltage output from the battery 10 is applied to the chopper 5, which performs a step-up operation to boost the DC voltage. The boosted voltage is then applied to the inverter 4. With this arrangement, power supplied from the battery 10 is utilized to continue operating the load 300.

The uninterrupted power supply apparatus 100 according to the embodiment is configured to synchronize the phase of the peak of the chopper carrier with the phase of the peak of the inverter carrier, and to use the synchronized chopper carrier to control the switching operation of the chopper 5. In the following, the reason for, and operation of, synchronizing the phase of the chopper carrier with the phase of the inverter carrier will be described in detail with reference to FIG. 2 and others.

Figure 2:
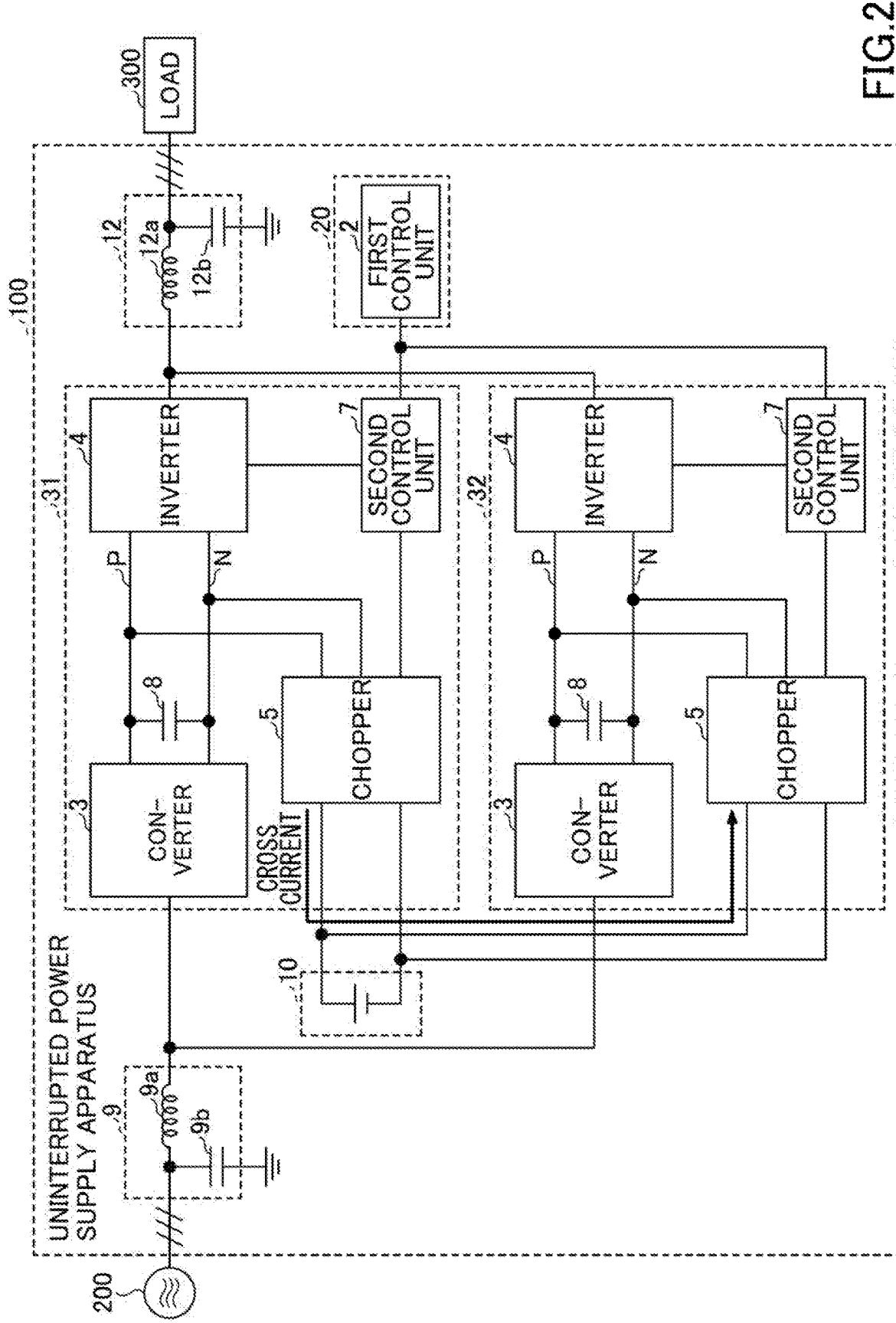
FIG. 2 is a drawing illustrating the circuit configuration of the uninterrupted power supply apparatus illustrated in FIG. 1.

FIG. 2 is a drawing illustrating the circuit configuration of the uninterrupted power supply apparatus illustrated in FIG. 1. In FIG. 2, only the first uninterrupted power supply module 31 and the second uninterrupted power supply module 32, among the plurality of uninterrupted power supply modules shown in FIG. 1, are illustrated for the sake of concise explanation. The uninterrupted power supply apparatus 100 illustrated in FIG. 2 includes a first noise filter 9 for eliminating noise transmitted to the AC power supply 200 and a second noise filter 12 for eliminating noise transmitted to the load 300, in addition to the first uninterrupted power supply module 31 and the second uninterrupted power supply module 32.

The first noise filter 9 includes an inductor 9a, with one end thereof connected to the AC power supply 200 and the other end connected to the converters 3, and further includes a capacitor 9b, with one end thereof connected to both the AC power supply 200 and the inductor 9a and the other end connected to the ground. The inductor 9a reflects radio frequency noise transmitted from the converter 3 toward the AC power supply 200, thereby reducing the intrusion of noise into the AC power supply 200. The capacitor 9b guides the radio frequency noise to the ground, thereby reducing the intrusion of noise into the AC power supply 200.

The second noise filter 12 includes an inductor 12a, with one end thereof connected to the inverters 4 and the other end connected to the load 300, and further includes a capacitor 12b, with one end thereof connected to both the inductor 12a and the load 300 and the other end connected to the ground. The inductor 12a reflects radio frequency noise transmitted from the inverter 4 toward the load 300, thereby reducing the intrusion of noise into the load 300. The capacitor 12b guides the radio frequency noise to the ground, thereby reducing the intrusion of noise into the load 300.

Each of the first uninterrupted power supply module 31 and the second uninterrupted power supply module 32 includes a smoothing capacitor 8 for smoothing the DC voltage output from the converter 3, in addition to the converter 3, the inverter 4, the chopper 5, and the second control unit 7. One end of the smoothing capacitor 8 is connected to a first bus line P that is the DC bus line on the positive electrode side, and the other end of the smoothing capacitor 8 is connected to a second bus line N which is the DC bus line on the negative electrode side.

Figure 3:
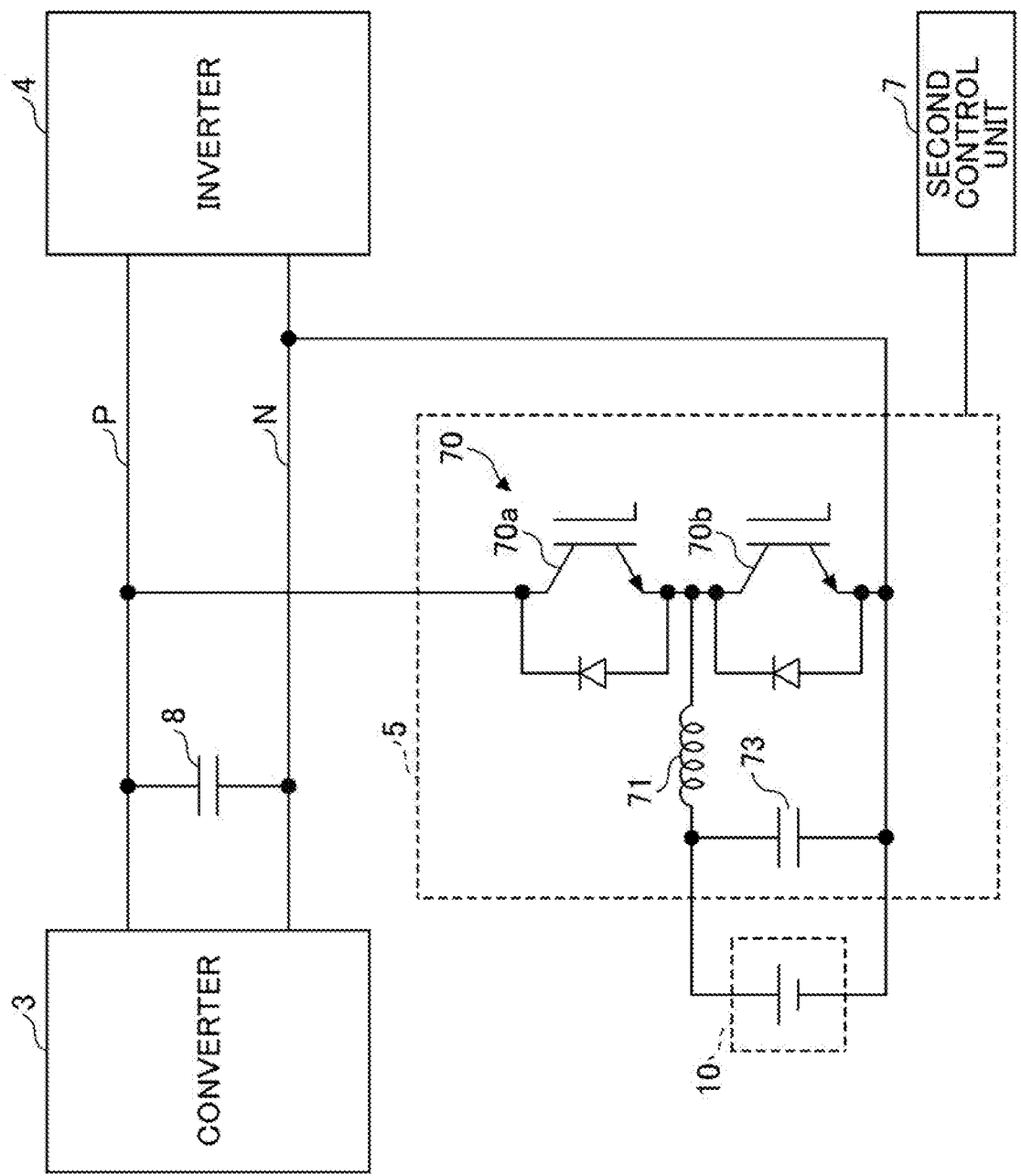
FIG. 3 is a drawing illustrating an example of the configuration of a chopper illustrated in FIG. 1.

FIG. 3 is a drawing illustrating an example of the configuration of a chopper illustrated in FIG. 1. As an example, the chopper 5 includes a series connection 70 implemented by connecting a semiconductor switching device 70a and a semiconductor switching device 70b in series, a choke coil 71, and a smoothing capacitor 73. Each of the semiconductor switching device 70a and the semiconductor switching device 70b has an anti-parallel connected diode. It suffices for each of the semiconductor switching device 70a and the semiconductor switching device 70b to be a switching means capable of switching operations, which may be an IGBT (insured gate bipolar transistor) or a MOSFET (metal oxide semiconductor-field effect transistor). MOSFETs may be used when the capacity of the chopper 5 is relatively low (i.e., low voltage). IGBTs may be used when the capacity of the chopper 5 is relatively high so as to require an increased breakdown voltage. The semiconductor switching device 70a is connected to the first bus line P. The semiconductor switching device 70b is connected to the second bus line N.

One end of the choke coil 71 is connected to the connection point between the two semiconductor switching devices 70a and 70b. The other end of the choke coil 71 is connected to one end of the smoothing capacitor 73 and to the positive electrode of the battery 10. The other end of the smoothing capacitor 73 is connected to the negative electrode of the battery 10 and to the semiconductor switching device 70b.

During the step-down operation, the semiconductor switching device 70a keeps switching between on and off states in accordance with the drive signal, thereby lowering the output voltage of the converter 3 for provision to the battery 10. During the step-up operation, the semiconductor switching device 70b keeps switching between on and off states in accordance with the drive signal, thereby boosting the output voltage of the battery 10 for provision to the inverter 4. The configuration of the chopper is not limited to the example illustrated in FIG. 3. Any configuration suffices as long as the battery 10 can be charged by lowering the output voltage of the converter 3 in the case of no power failure, and power stored in the battery 10 can be supplied to the inverter 4 by boosting the output voltage of the battery 10 in the case of power failure.

In the uninterrupted power supply apparatus 100 configured in this manner, power activation timing may be misaligned between the first uninterrupted power supply module 31 and the second uninterrupted power supply module 32. In such a case, the phases of chopper carriers fail to be synchronized, which creates a potential difference between the chopper 5 of the first uninterrupted power supply module 31 and the chopper 5 of the second uninterrupted power supply module 32. As a result, circulating current is generated, flowing in the route illustrated by an arrow in FIG. 2. This circulating current is referred to as cross current.

FIG. 4 is a drawing illustrating the phases of chopper carriers observed when cross current occurs. FIG. 4 shows, from top to bottom, the waveform of the carrier (A) corresponding to the phase information generated by the first control unit 2 of the main control unit 20, the waveform of an inverter carrier (B-1), the waveform of a chopper carrier (B-2), the waveform of an inverter carrier (C-1), and the waveform of a chopper carrier (C-2). The inverter carrier (B-1) is a triangular wave for inverter control that is generated by the second control unit 7 of the first uninterrupted power supply module 31 such as to be synchronized with the phase information generated by the first control unit 2. The chopper carrier (B-2) is a triangular wave for chopper control that is generated by the second control unit 7 of the first uninterrupted power supply module 31 such as to be synchronized with the inverter carrier (B-1). The inverter carrier (C-1) is a triangular wave for inverter control that is generated by the second control unit 7 of the second uninterrupted power supply module 32 such as to be synchronized with the phase information generated by the first control unit 2. The chopper carrier (C-2) is a triangular wave for chopper control that is generated by the second control unit 7 of the second uninterrupted power supply module 32 such as to be synchronized with the inverter carrier (C-1).

The information transmitted through serial communication from the first control unit 2 to the second control unit 7 includes carrier information and, associated therewith, sequence numbers indicative of peaks and troughs of the carrier. The second control unit 7 utilizes the sequence numbers indicative of peaks and troughs of the carrier to synchronize the inverter carrier with the carrier generated by the first control unit 2. Because of this, the phase of peaks of the inverter carriers (B-1) and (C-1) is synchronized with the phase of peaks of the carrier (A). Further, the second control unit 7 detects the phase of peaks or troughs of the carrier so as to synchronize the phase of the chopper carrier with the phase of peaks or troughs of the carrier. In FIG. 4, the phase of peaks of the chopper carrier (B-2) is synchronized with the phase of peaks of the inverter carrier (B-1). Further, the phase of peaks of the chopper carrier (C-2) is synchronized with the phase of peaks of the inverter carrier (C-1).

Misalignment of power activation timing between the first uninterrupted power supply module 31 and the second uninterrupted power supply module 32 may cause the phase of the chopper carrier (C-2) to be displaced by 180 degrees with the phase of the chopper carrier (B-2). This creates a potential difference between the chopper 5 of the first uninterrupted power supply module 31 and the chopper 5 of the second uninterrupted power supply module 32, which results in the generation of cross current. In order to reduce the generation of cross current, the phase of peaks of the chopper carrier (B-2) needs to be synchronized with the phase of peaks of the chopper carrier (C-2).

The uninterrupted power supply apparatus 100 according to the embodiment is configured to synchronize the phases of peaks of chopper carriers between the uninterrupted power supply modules even when power activation timing is misaligned between the uninterrupted power supply modules. In the following, the operation of synchronizing the phase of peaks of chopper carriers will be described with reference to FIG. 5 through FIG. 7.

Figure 5:
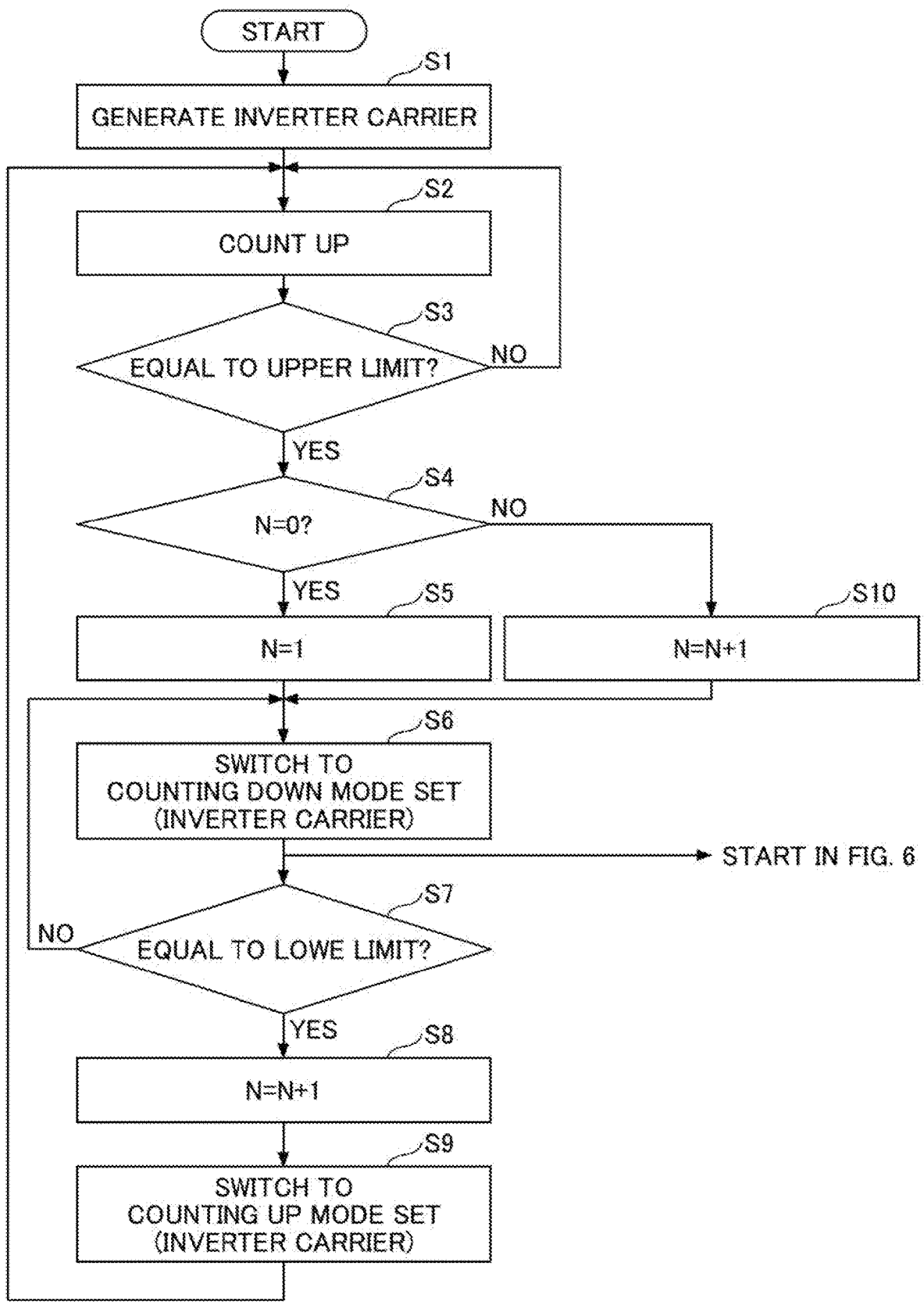
FIG. 5 is a flowchart of the process of synchronizing the phases of peaks of chopper carries in the uninterrupted power supply apparatus according to the embodiment.
Figure 6:
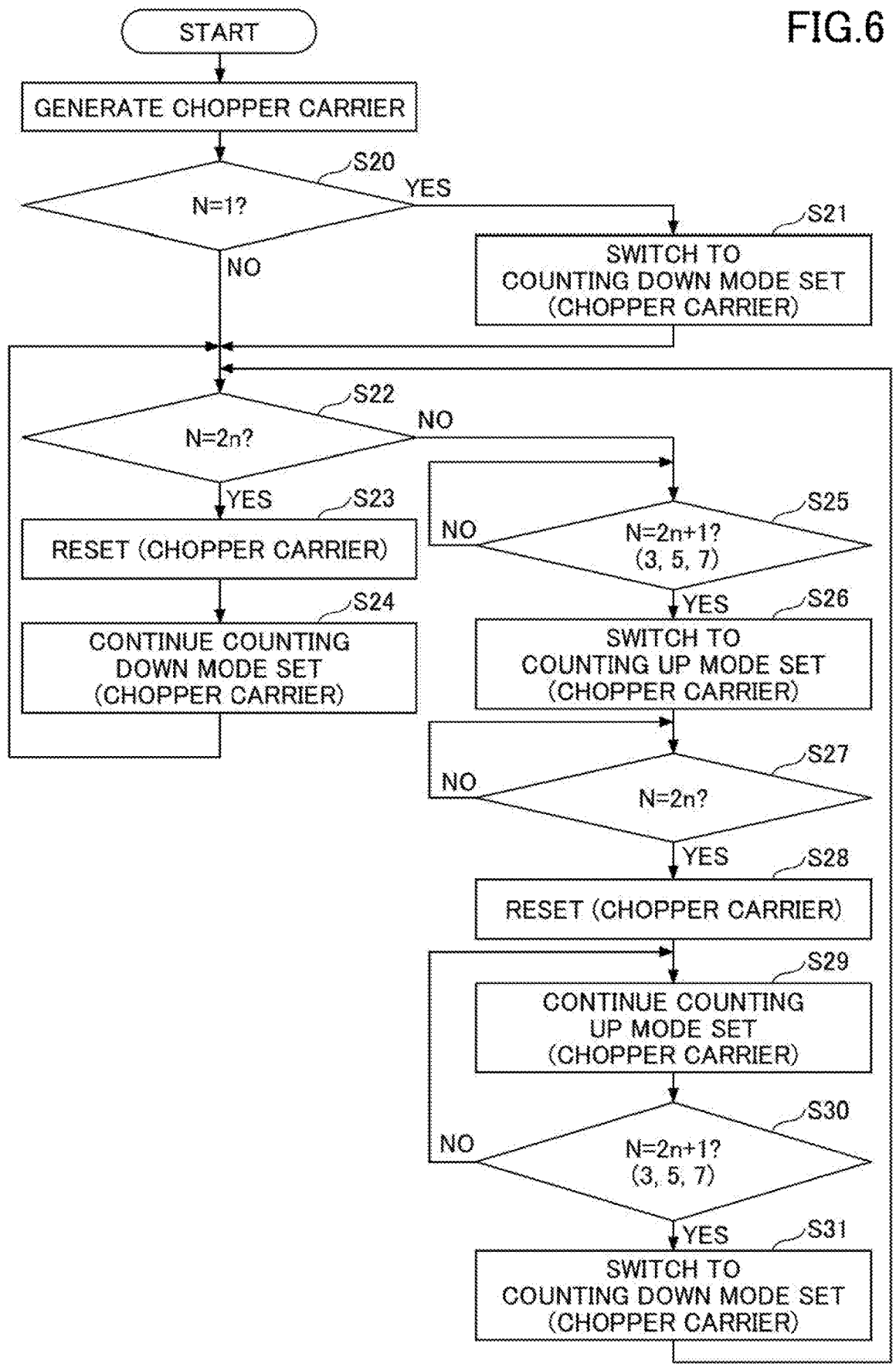
FIG. 6 is a flowchart of the process of synchronizing the phases of peaks of chopper carries in the uninterrupted power supply apparatus according to the embodiment.

FIG. 5 is a first flowchart of the process of synchronizing the phases of peaks of chopper carries in the uninterrupted power supply apparatus according to the embodiment. FIG. 6 is a second flowchart of the process of synchronizing the phases of peaks of chopper carries in the uninterrupted power supply apparatus according to the embodiment. FIG. 7 is a drawing illustrating the synchronized phases of peaks of chopper carriers. The waveforms illustrated in FIG. 7 correspond to the waveforms illustrated in FIG. 4. The difference from the waveforms in FIG. 4 is that the phase of peaks of the waveform (B-2) is synchronized with the phase of peaks of the waveform (C-2). It may be noted that the dot-and-dash lines superimposed on the waveforms (B-2) and (C-2) are a voltage indication Vref transmitted from the first control unit 2 to the second control unit 7. The magnitude of the voltage indication Vref is changed according to the step-up operation or the step-down operation. As will be described in the following, the inverter carriers of the uninterrupted power supply modules 31 through 34 are synchronized with the carrier of the main control unit 20 as illustrated in in FIG. 7, and, also, the synchronization of a chopper carrier with an inverter carrier as illustrated in FIG. 5 and FIG. 6 is established in each of the uninterrupted power supply modules 31 through 34.

Upon power activation of the uninterrupted power supply modules, the uninterrupted power supply modules start generating an inverter carrier (step S1). The timer counter for the inverter carrier is counted up (step S2). The second control unit 7 checks whether the count of the timer counter has reached the upper limit (e.g., +2000) (step S3). In the case of the count of the timer counter having not reached the upper limit (NO in step S3), the processes in steps S2 and S3 are repeated until the count of the timer counter reaches the upper limit.

In the case of the count of the timer counter having reached the upper limit (YES in step S3), the second control unit 7 checks whether the value of a sequence number N indicative of a peak or trough of the inverter carrier is equal to 0 (step S4). The sequence number N has an initial value "0" assigned thereto immediately after the power activation of the uninterrupted power supply modules. The value of the sequence number N is counted up in a cyclic manner at the time the timer counter switches from counting-up to counting-down and at the time the timer counter switches from counting-down to counting-up.

In the case of the value of the sequence number N being equal to "0" (YES in step S4), the second control unit 7 adds "1" to the initial value "0" to update the value of the sequence number N. As a result, the sequence number "1" is assigned to a peak of the inverter carrier. Upon the sequence number "1" being set to the peak of the inverter carrier, the timer counter for the inverter carrier switches from counting-up (i.e., counting-up mode set) to counting-down (i.e., counting-down mode set) (step S6). Subsequently, the second control unit 7 checks whether the count of the timer counter has reached the lower limit (e.g., −2000) (step S7). In the case of the count of the timer counter having not reached the lower limit (NO in step S7), the processes in steps S6 and S7 are repeated until the count of the timer counter reaches the lower limit.

In the case of the timer counter having reached the lower limit (YES in step S7), the second control unit 7 adds "1" to the sequence number N to update the value of the sequence number N. For example, the value of the sequence number N updated in step S8 immediately after power activation is "2." As a result, the sequence number "2" is assigned to a trough of the inverter carrier. Upon the sequence number "2" being set to the trough of the inverter carrier, the timer counter for the inverter carrier switches from counting-down to counting-up (step S9). Thereafter, the processes in step S2 through step S4 are repeated.

When it is found in step S4 that the value of the sequence number N is other than "0" (NO in step S4), the second control unit 7 adds "1" to the sequence number N to update the value of the sequence number N (step S10). For example, when the value of the sequence number N is "2" before performing the process of step S10, the updated value of the sequence number N becomes "3". As a result, the sequence number "3" is assigned to a peak of the inverter carrier. After the process of step S10, the process in step S6 is performed again, so that the timer counter for the inverter carrier switches from counting-up to counting-down.

The processes in step S2 through step S10 are repeatedly performed as described above, so that sequence numbers such as "1", "3", "5", and "7" are assigned to the peaks of the inverter carrier, and sequence numbers such as "2", "4", "6", and "8" are assigned to the troughs of the inverter carrier. Namely, odd numbers are set to the peaks of the inverter carrier, and even numbers are set to the troughs of the inverter carrier.

It may be noted that the phase information is transmitted from the first control unit 2 to the second control units 7 in the uninterrupted power supply modules for the purpose of synchronizing the inverter carriers with the carrier (A) corresponding to the phase information generated in the first control unit 2. The phase information may be a synchronizing signal transmitted at the timing of each peak of the carrier (A), for example, or may be a pulse signal comprised of high pulses and low pulses whose widths indicate the counting-up period and the counting-down period, respectively, of the carrier (A), for example. Alternatively, the transmitted phase information may be the carrier (A) as it is. The phase information also includes information indicative of phase positions beyond one cycle, i.e., 360 degrees, and may include sequence numbers sequentially assigned to the peaks of the carrier (A), for example. While performing the process of generating an inverter carrier as illustrated in FIG.

5, the second control unit 7 may utilize PLL control or the like to synchronize the generated inverter carrier with the received phase information.

The second control unit 7 performs the process of generating a chopper carrier, as illustrated in FIG. 6, in parallel with the process of generating an inverter carrier as illustrated in step S2 to step S9 of FIG. 5. When the value of the sequence number N becomes "1" in step S6, the process of generating a copper carrier illustrated in FIG. 6 will be started. In step S20 following the start of generating a copper carrier, a check is made as to whether the value of the sequence number N indicative of a peak or trough of the inverter carrier is equal to 1. Immediately after power activation, the timer counter for the chopper carrier is being counted up. When the value of the sequence number N is equal to "1" (YES in step S20), the timer counter for the chopper carrier is switched from counting-up to counting-down, with the sequence number "1" being assigned to the peak of the chopper carrier (step S21). The sequence number "1" assigned to the chopper carrier is equal to the sequence number "1" assigned to the inverter carrier, so that the phase of the peak of the chopper carrier is in synchronization with the phase of the peak of the inverter carrier. As a result of the processes performed in steps S20 and S21, each second control unit 7 of the uninterrupted power supply modules has the sequence number "1" assigned to the peak of the chopper carrier, so that the phases of the chopper carriers are also in synchronization with each other. After the process of step S21, the process of step S22 is performed.

Also, when it is found in step S20 that the sequence number N is other than "1" (NO in step S20), the process of step S22 is performed.

In step S22, a check is made as to whether the value of the sequence number N is equal to 2n (n is a natural number greater than or equal to one). In the case of the value of the sequence number N being equal to 2n (YES in step S22), as in the case of N=2, 4, 6, 8, or the like, the count of the timer counter for the chopper carrier is reset (step S23), and the timer counter for the chopper carrier continues counting-down after resetting (step S24). After the process of step S24, the process of step S22 is performed. Resetting the count ensures that the peaks and troughs of the chopper carrier have a symmetrical shape.

When it is found in step S22 that the value of the sequence number N is other than 2n (NO in step S22), a check is made as to whether the value of the sequence number N is equal to 2n+1 (n is a natural number greater than or equal to one) (step S25). Namely, a check is made as to whether the value of the sequence number N is equal to 3, 5, 7, or the like. In the case of the value of the sequence number N being different from 2n+1 (NO in step S25), the process in step S25 is repeated until the value of the sequence number N becomes equal to 2n+1. In the case of the value of the sequence number N being equal to 2n+1 (YES in step S25), the timer counter for the chopper carrier is switched from counting-down to counting-up, with the sequence number "3", for example, being assigned to the trough of the chopper carrier (step S26). The sequence number "3" assigned to the chopper carrier is equal to the sequence number "3" assigned to the inverter carrier, so that the phase of the trough of the chopper carrier is in synchronization with the phase of the peak of the inverter carrier. As a result of the processes performed in steps S25 and S26, each second control unit 7 of the uninterrupted power supply modules has the sequence number "3" assigned to the trough of the chopper carrier, so that the phases of the chopper carriers are also in synchronization with each other. After the process of step S26, the process of step S27 is performed.

In step S27, a check is made as to whether the value of the sequence number N is equal to 2n (n is a natural number greater than or equal to one). In the case of the value of the sequence number N being different from 2n (NO in step S27), the process in step S27 is repeated until the value of the sequence number N becomes equal to 2n. In the case of the value of the sequence number N being equal to 2n (YES in step S27), as in the case of N=4 or the like, the count of the timer counter for the chopper carrier is reset (step S28), and the timer counter for the chopper carrier continues counting-up after resetting (step S29). After the process of step S29, the process of step S30 is performed.

In step S30, a check is made as to whether the value of the sequence number N is equal to 2n+1 (n is a natural number greater than or equal to one). Namely, a check is made as to whether the value of the sequence number N is equal to 5 or the like. In the case of the value of the sequence number N being different from 2n+1 (NO in step S30), the processes in step S29 and S30 are repeated until the value of the sequence number N becomes equal to 2n+1. In the case of the value of the sequence number N being equal to 2n+1 (YES in step S30), the timer counter for the chopper carrier is switched from counting-up to counting-down, with the sequence number "5", for example, being assigned to the peak of the chopper carrier (step S31). The sequence number "5" assigned to the chopper carrier is equal to the sequence number "5" assigned to the inverter carrier, so that the phase of the peak of the chopper carrier is in synchronization with the phase of the peak of the inverter carrier. As a result of the processes performed in steps S27 through S31, each second control unit 7 of the uninterrupted power supply modules has the sequence number "5" assigned to the peak of the chopper carrier, so that the phases of the chopper carriers also coincide with each other. After the process in step S31, the processes in step S22 and the subsequent steps are repeated.

As described above, the uninterrupted power supply apparatus 100 according to the embodiment includes the first control unit 2 for outputting phase information and a voltage indication for controlling the timing of switching operations of the choppers 5 and the inverters 4, and includes the second control unit 7 provided in each of the uninterrupted power supply modules. The second control unit 7 provided in each of the uninterrupted power supply modules is configured to generate the first triangular carrier in synchronization with the phase information, to generate the second triangular carrier such that the phase of peaks of the second triangular carrier is synchronized with the phase of peaks of the first triangular carrier, the first triangular carrier being used with the voltage indication to control switching operations of the switching devices provided in the inverter 4, the second triangular carrier being used with the voltage indication to control switching operations of the switching devices provided in the chopper 5. As was previously described, the phase information includes information indicative of phase positions beyond one cycle, i.e., 360 degrees. The first triangular carrier is synchronized with such phase information transmitted from the first control unit 2, and the second triangular carrier is synchronized with the first triangular carrier such as to be synchronized with the phase information, so that the peaks of the second triangular carriers having the n times as long a period are synchronized with each other in the uninterrupted power supply modules. To be more specific, based on the phase information and the voltage indication, the second control unit 7 synchronizes the phase of peaks of the second triangular carrier for controlling the switching operation of the chopper 5 with the phase of peaks of the first triangular carrier for controlling the switching operation of the inverter 4, and controls the switching operation of the chopper 5 by use of the synchronized second triangular carrier. This configuration prevents a potential difference between the choppers 5 from being generated, thereby reducing cross current. It is thus possible to reduce the occurrence of failure, such as permanent damage to the semiconductor switching devices 70a and 70b of the chopper 5 caused by overcurrent flowing therethrough due to the generation of cross current. As a result, a component such as an attenuator does not need to be provided for the purpose of reducing overcurrent caused by cross current. The manufacturing cost of the uninterrupted power supply apparatus 100 is thus reduced, and, also, the structure of the uninterrupted power supply apparatus 100 is simplified. Simplification of the structure of the uninterrupted power supply apparatus 100 improves the reliability of the uninterrupted power supply apparatus 100.

The present embodiment has been described with respect to an example in which the phase of peaks of a chopper carrier is synchronized with the phase of peaks of an inverter carrier. Notwithstanding this, the uninterrupted power supply apparatus 100 may be configured such that the phase of troughs of a chopper carrier is synchronized with the phase of troughs of an inverter carrier. This configuration also prevents a potential difference between the choppers 5 from being generated, thereby reducing cross current.

In the uninterrupted power supply apparatus 100, the second control units 7 provided in the respective uninterrupted power supply modules are star-connected to the first control unit 2b. The second control units 7 may alternatively be connected in a daisy chain, in which configuration the phase of peaks or troughs of the inverter carrier can also be synchronized with the phase of peaks or troughs of the chopper carrier. In the case of a daisy-chain connection, the second control units 7 need to be connected in series along a cascading connection line, so that each sub-control board 6 needs to have an additional connector to which the cascading connection line is connected. As a result, the structure of the sub-control board 6 becomes complex, resulting in an increase in manufacturing cost. Also, the space for mounting other semiconductor devices on the sub-control board 6 decreases, which would in turn require an increase in the total area of the sub-control board 6, resulting in an increase in the size of the uninterrupted power supply modules. Moreover, the larger the number of uninterrupted power supply modules is, the larger the number of steps required to connect the cascading connection line is. In the case of a daisy chain connection, the control of communication between the second control units 7 is more complex than in the case of a star connection, which imposes an increased processing load on the CPU (central processing unit) or the like provided in each second control unit 7. When the second control units 7 are star-connected to the first control unit 2, the sub-control board 6 does not need the connector for the cascading connection line, which serves to simplify the structure of the sub-control board 6 and to reduce the manufacturing cost of the sub-control board 6. The simplification of the structure of the sub-control board 6 improves the reliability of the second control unit 7. Further, the control of communication between the second control units 7 is simplified, which makes it possible to use inexpensive CPUs having a low performance specification.

The configuration described in the above-noted embodiment illustrates one example of the present invention, and may be combined with other technologies known in the art. Modification or removal of part of the configuration may be made without departing from the scope and spirit of the invention.

What is claimed is:

1. An uninterrupted power supply apparatus, comprising:
a battery;
a plurality of uninterrupted power supply modules each including a converter, a chopper, and an inverter, the converter configured to convert an AC voltage to a first DC voltage, the chopper configured to convert the first DC voltage from the converter to charge the battery and to convert a second DC voltage from the battery into a third DC voltage, the inverter configured to convert the first DC voltage from the converter or the third DC voltage from the chopper into an AC voltage; and
a first control unit configured to output a voltage indication and phase information for controlling timing of switching operations of switching devices provided in the chopper and the inverter,
wherein each of the uninterrupted power supply modules includes a second control unit that is configured to generate a first triangular carrier in synchronization with the phase information, to generate a second triangular carrier such that a phase of the second triangular carrier is synchronized with a phase of the first triangular carrier, the first triangular carrier being used with the voltage indication to control switching operations of the switching devices provided in the inverter, the second triangular carrier being used with the voltage indication to control switching operations of the switching devices provided in the chopper, and
wherein the second triangular carrier for the chopper has a period that is greater than and a multiple of a period of the first triangular carrier for the inverter, and the second triangular carrier is generated such that the second triangular carrier generated in any given module among the uninterrupted power supply modules has peaks that coincide in time with peaks of the second triangular carrier generated in another module among the uninterrupted power supply modules.

2. An uninterrupted power supply apparatus, comprising:
a battery;
a plurality of uninterrupted power supply modules each including a converter, a chopper, and an inverter, the converter configured to convert an AC voltage to a first DC voltage, the chopper configured to convert the first DC voltage from the converter to charge the battery and to convert a second DC voltage from the battery into a third DC voltage, the inverter configured to convert the first DC voltage from the converter or the third DC voltage from the chopper into an AC voltage; and
a first control unit configured to output a voltage indication and phase information for controlling timing of switching operations of switching devices provided in the chopper and the inverter,
wherein each of the uninterrupted power supply modules includes a second control unit that is configured to generate a first triangular carrier in synchronization with the phase information, to generate a second triangular carrier such that a phase of peaks or troughs of the second triangular carrier is synchronized with a phase of peaks or troughs of the first triangular carrier, the first triangular carrier being used with the voltage indication to control switching operations of the switching devices provided in the inverter, the second triangular carrier being used with the voltage indication to control switching operations of the switching devices provided in the chopper, and wherein the second triangular carrier for the chopper has a period that is greater than and a multiple of a period of the first triangular carrier for the inverter, and the second triangular carrier is generated such that the second triangular carrier generated in any given module among the uninterrupted power supply modules has peaks that coincide in time with peaks of the second triangular carrier generated in another module among the uninterrupted power supply modules.

3. The uninterrupted power supply apparatus as claimed in claim 1, wherein each of the plurality of second control units is directly connected to the first control unit through a communication line.

4. The uninterrupted power supply apparatus as claimed in claim 2, wherein each of the plurality of second control units is directly connected to the first control unit through a communication line.

* * * * *